B. W. ROTH.
VEHICLE WHEEL.
APPLICATION FILED NOV. 7, 1917.
1,351,345.
Patented Aug. 31, 1920.
2 SHEETS—SHEET 2.
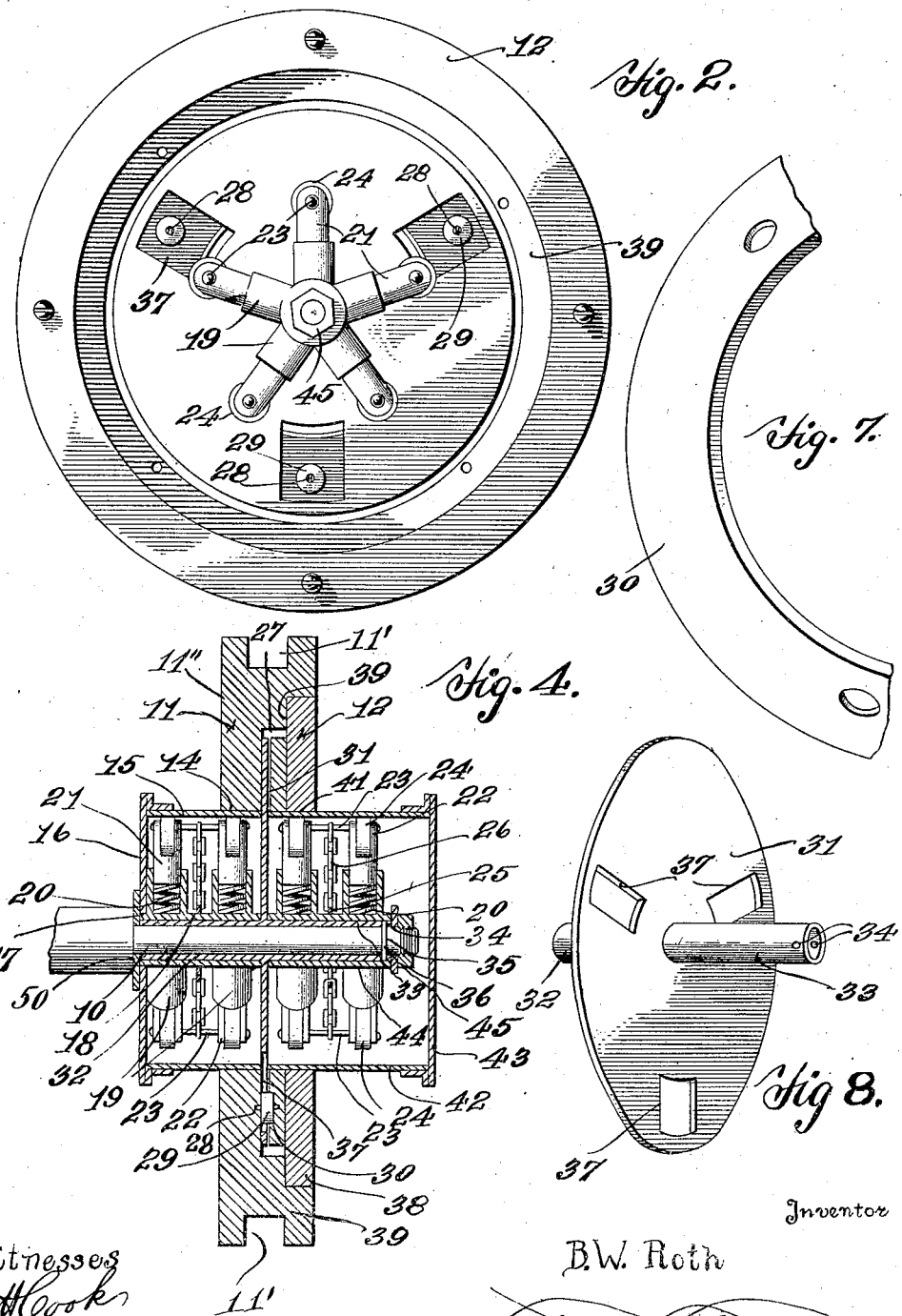
Witnesses
C. H. Cook
E. L. Mueller
Inventor
B. W. Roth
By Chandler & Chandler
Attorney

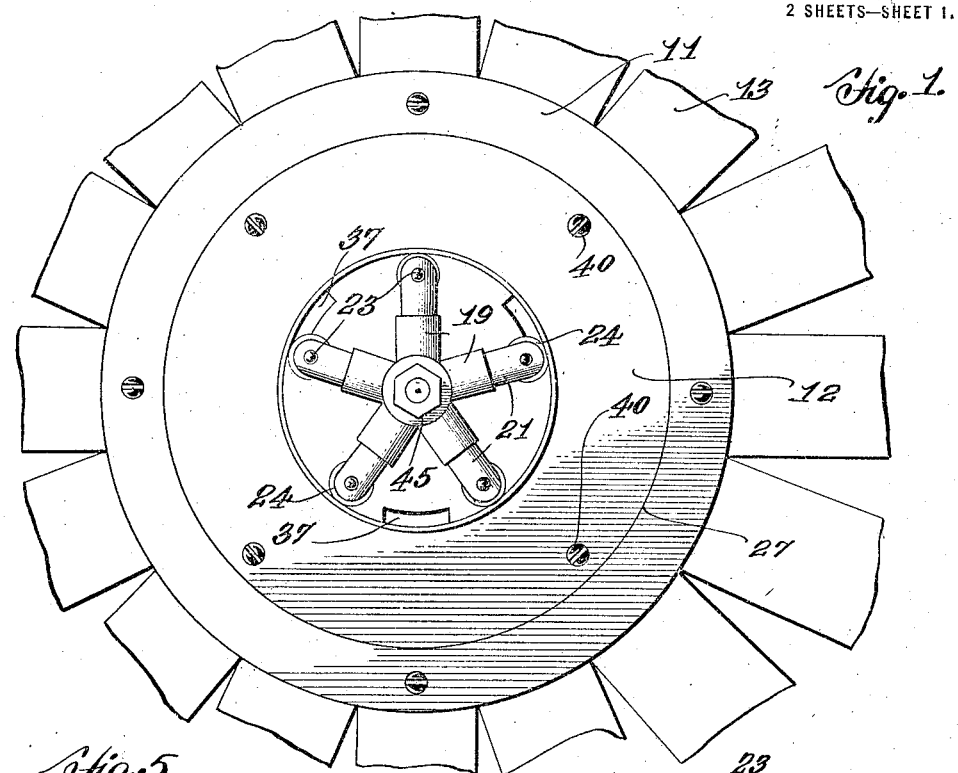
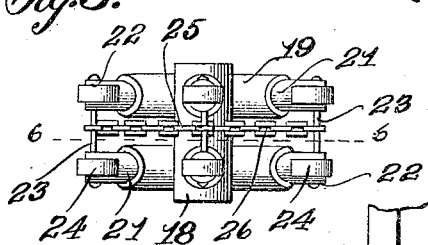
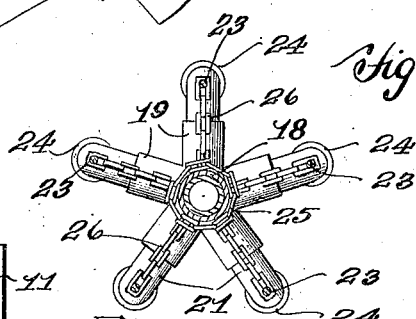

UNITED STATES PATENT OFFICE.

BENJAMIN W. ROTH, OF ALLENTOWN, PENNSYLVANIA.

VEHICLE-WHEEL.

1,351,345.   Specification of Letters Patent.   Patented Aug. 31, 1920.

Application filed November 7, 1917. Serial No. 200,750.

*To all whom it may concern:*

Be it known that I, BENJAMIN W. ROTH, a citizen of the United States, residing at Allentown, in the county of Lehigh, State of Pennsylvania, have invented certain new and useful Improvements in Vehicle-Wheels; and I do hereby declare the following to be a full, clear, and exact description of the invention, such as will enable others skilled in the art to which it appertains to make and use the same.

This invention is an improvement in vehicle wheels and has particular reference to a resilient hub therefor.

An object of the invention is to provide an improved vehicle wheel in which the hub portion thereof is so constructed as to cushion the wheel against vibrations and other shocks incident to the travel of the wheel over rough surfaces.

Another object is to provide novel means for transmitting the power from the axle to the wheel in such manner that the same will be driven when the axle is rotated in either direction.

A further object is the provision of shock absorbing members of improved construction which will yieldably resist the strain and distribute the same when traveling over rough surfaces.

A still further object is to provide a vehicle of this character which is of a compact formation, simple in construction, inexpensive to manufacture and effective in carrying out the purposes for which it is designed.

The inventive idea involved is capable of receiving a variety of mechanical expressions one of which, for the purpose of illustrating the invention, is shown in the accompanying drawing, wherein:—

Figure 1 is a fragmentary side elevation of a wheel constructed in accordance with the invention and with a part removed to show a portion of the interior construction of the hub.

Fig. 2 is an end elevation of the hub ring with its end plate removed and illustrating the arrangement of one set of shock absorbing members.

Fig. 3 is an edge view of a portion of the hub ring with the projecting casings that are associated with it.

Fig. 4 is a sectional view taken axially of the hub with parts in elevation.

Fig. 5 is a plan view of one group of shock absorbing members.

Fig. 6 is a section on the line 6—6 of Fig. 5.

Fig. 7 is a fragmentary perspective of a ring member employed.

Fig. 8 is a perspective view of the power transmitting element.

The wheel illustrated comprises a hub ring 11 having a circumscribing groove 11' in which are disposed and held the spokes 13, in the usual manner. From one end of the ring 11 there extends inwardly the radial flange 11" in which is snugly fitted one end of a cylindrical casing 15 having at its outer end a removable closure 16 provided with a central opening 17 in which is received the axle 10 as shown in Fig. 4. The opposite end of the ring 11 is recessed and in the recess is fitted an annular plate 12 within the inclosure of which is fixed a cylindrical casing 42 of the same diameter as the casing 15 and which projects outwardly beyond the outer face of the annular plate 12. The inner ends of the casings 15 and 42 slidably contact a disk 31 to be hereinafter referred to.

The casings 15 and 42 inclose each a shock absorbing member preferably comprising a sleeve 18 of considerably larger diameter than the axle 10 and receiving the same, each sleeve having a plurality of cylinders 19 radiating therefrom and in each of which is mounted a coil spring 20 normally exerting an outward pressure upon the inner end of a plunger or piston 21 mounted in the cylinder. The outer end of each plunger is bifurcated as indicated at 22 and extending through the bifurcations of oppositely disposed plungers is a transverse bolt 23 which rotatably supports a roller 24 within each of the bifurcations. In order to prevent disengagement of the plungers 21 from the cylinders 19 should the shock absorber be removed from the casing for repairs or otherwise, there are provided chains 25 which encircle the sleeve 18 between the pairs of cylinders 19 at each end thereof and which have radially extending links 26 connected to the bolts 23 and through the medium of these links it will be apparent that excessive outward movement of the plungers 21 is prevented.

The flange 11" of the hub ring 11 is provided with a plurality of pins 28 having the rollers 29 mounted thereon and which are retained in position by means of a ring 30 mounted upon the casing 42 and held against rotation by means of said pins.

The ring 30 is recessed to accommodate the rollers 29, as shown in Figs. 4 and 7 and lies snugly between the ring plate 12 and the disk 31. The rollers 29 lie in radial slots 37 formed in the disk 31 and this disk 31 is carried by a boxing 33 upon which the sleeves 18 are directly disposed, the boxing 33 being fastened to the axle 10 by means of a pin 36 passed through alining perforations in the boxing and axle. The disk 31, as illustrated, lies between the inner ends of the sleeves 18. Upon the inner end portion of the axle is disposed an annular plate 50 which snugly fits the axle and is of sufficient diameter to cover the central opening 17 of the casing 15 and thus exclude foreign matter. The ends 16 and 43 respectively of the casings 15 and 42 are removable.

From the above description it will be understood that the axle may have a limited movement radially within the casings and against the tendencies of corresponding springs 20 which will serve to absorb shocks and there will thus be provided a cushioning effect, the rollers 24 bearing at all times against the inner surface of the corresponding casings.

The structure is secured to the axle 10 when used as a drive wheel, in some such manner as illustrated and described when rotation of the axle will cause the corresponding walls of the radial openings 37 of the disk 31 to bear against the rollers 29 and carry the hub ring with it, the dimensions of the walls 37 permitting of proper radial movement of the disk 31 with respect to the hub ring.

What is claimed is:—

1. The combination with an axle, a hub including a cylindrical casing inclosing the axle, and means for communicating rotary movement from the axle to the hub; of shock absorbing members on the axle within the hub, each having an element yieldingly distended into normal contact with said casing, a chain encircling said axle, and chains radiating from it and each connected with one of said elements.

2. The combination with an axle; of a hub surrounding said axle, shock absorbing members mounted in said hub and each including a plurality of oppositely disposed and radially extending cylinders supported from the axle, spring pressed plungers slidable in said cylinders and having rollers at their outer ends in contact with portions of the hub in supporting relation thereto, bolts extending through oppositely disposed plungers, and a chain having portions connected to the bolts for limiting the outward movement of said plungers.

3. The combination with an axle; of a hub including sections, abutments carried by one of the sections, sleeves surrounding said axle and loose thereon, a disk carried by the axle and standing between the inner ends of said sleeves and having openings receiving said abutments whereby rotary movement is transmitted from the axle to the wheel, and resilient shock absorbing members inclosed in the sections of said hub and mounted upon said sleeves.

4. The combination with an axle; of a wheel hub comprising sections, stops carried by one of the sections of the hub, a boxing surrounding said axle and keyed thereto, a disk fixed upon the boxing midway of its ends and having openings receiving said stops whereby rotary movement is transmitted from the axle to the wheel, sleeve sections loosely carried by the boxing at opposite sides of the disk, cylinders extending radially from said sleeve sections, and shock absorbers carried by said cylinders.

5. The combination with an axle, a boxing fast thereon, a disk fast on the boxing and having radial slots, a hollow hub comprising alined cylindrical casings on opposite sides of said disk and hub rings carried by the casings, and connections between the disk and rings for revolving them by the rotation of the axle; of closures for the inner and outer ends of said casing, a nut at the outer end of the axle inside the outer closure, a sleeve loose on said boxing between the nut and disk, a second sleeve loose thereon between the disk and the inner closure, and shock absorbing members carried on said sleeves and distended with yielding force into normal contact with the interior of said casing.

6. The combination with an axle; of a hub surrounding said axle, shock absorbing members mounted in said hub and each including a plurality of oppositely disposed and radially extending cylinders supported from the axle, spring pressed plungers slidable in said cylinders and having their outer ends in contact with portions of the hub in supporting relation thereto, connecting elements extending between oppositely disposed plungers, and a flexible element having portions connected to the last named elements for limiting the outward movement of said plungers.

In testimony whereof I affix my signature in the presence of two witnesses.

BENJAMIN W. ROTH.

Witnesses:
 BESSIE M. DICKERT,
 CHAS. L. WALTERS.